United States Patent [19]
Tolson

[11] Patent Number: 5,500,925
[45] Date of Patent: Mar. 19, 1996

[54] DYNAMIC IMAGE PROCESSING USING PARTICLE SYSTEMS

[75] Inventor: Michael Tolson, Mill Valley, Calif.

[73] Assignee: Xaos Tools, San Francisco, Calif.

[21] Appl. No.: 983,894

[22] Filed: Dec. 1, 1992

[51] Int. Cl.$^6$ .................................................. G06T 11/80
[52] U.S. Cl. ............................................. 395/131; 395/133
[58] Field of Search ...................................... 395/131, 133

[56] References Cited

U.S. PATENT DOCUMENTS 5,310,591  5/1994  Dodge et al. ..................... 428/195 X

OTHER PUBLICATIONS

Haeberli, P., "Paint by Numbers: Abstract Image Representations," *Computer Graphics*, vol. 24, No. 4, Aug. 1990, pp. 207–214.

Reeves, W. T., "Particle Systems—A Technique for Modeling a Class of Fuzzy Objects," ACM Transactions on Graphics, vol. 2, No. 2, Apr. 1983, pp. 91–108.

Cockshott, T., Patterson, J., England, D., "Modelling the Texture of Paint", Eurographics '92, vol. II (1992), No. 3, pp. C–217–226.

Smith, A., "PAINT," *Computer Graphics Lab, New York Institute of Technology*, Technical Memo No. 7, Jul. 20, 1978, pp. 1–16.

*Primary Examiner*—Phu K. Nguyen
*Assistant Examiner*—Cliff Nguyen Vo
*Attorney, Agent, or Firm*—Charles E. Gotlieb; Judson D. Cary; Amir H. Raubvogel

[57] ABSTRACT

A system and method for processing moving images employ an interactive particle system comprising virtual image processing elements, or paintbrushes, in order to avoid problems of noise amplification and sensitivity to temporal discontinuities in source images. Attributes and parameters of paintbrushes may be specified by the user, and may vary dependent on the content of the source image. Paintbrushes may interact and may respond to virtual forces of various types. The system and method provide mechanisms by which the user may specify force parameters, by which source images can become forces, and by which force attributes may diffuse throughout the display field.

28 Claims, 15 Drawing Sheets

DYNAMIC IMAGE PROCESSING USING PARTICLE SYSTEMS

BACKGROUND OF THE INVENTION

1. Field of the Invention

This invention relates to dynamic image processing technologies and, more particularly, to a dynamic image processing system and method employing an interactive particle system comprising virtual image processing elements, or paintbrushes.

2. Description of the Related Art

Image processing systems provide tools for generating images, as well as for altering the appearance of pre-existing images. Typically, such systems allow a user to specify various effects and parameters, which are then applied to an image by a computer running image processing software. The processed image is often a distortion of an original image resulting from the application of user-specified effects and parameters. Such systems are generally used to enhance the artistic appeal of images. One typical effect is to simulate an impressionist painting style by using an ordered collection of paintbrush strokes to approximate the original image, as described in P. Haeberli, "Paint By Numbers: Abstract Image Representations", in *Computer Graphics*, vol. 24, no. 4, August 1990, pp. 207–14, incorporated herein by reference.

It is desirable to provide image processing effects for moving images. Such effects could be used to generate moving images, or to transform existing moving images found in source video or film. Source video and film, however, are inherently noisy and typically contain temporal discontinuities and sudden changes. Application of conventional image processing techniques to motion video and film tends to amplify noise. As a result of noise amplification and the sensitivity of image processing effects to the temporal discontinuities, many graphic effects used in conventional image processing produce undesirable results when applied to moving images.

SUMMARY OF THE INVENTION

In accordance with the present invention, there is provided a system and method for processing moving images, employing an interactive particle system comprising virtual image processing elements, or paintbrushes, in order to avoid problems associated with noise amplification and sensitivity to temporal discontinuities in source images. Various attributes and parameters of these paintbrushes may be specified by the user, and may vary in response to selected characteristics of the source image content.

The paintbrushes act in a similar manner as particles in conventional particle systems in that their motion, orientation, and other behavior respond to virtual forces specified by the user. See W. T. Reeves, "Particle Systems-A Technique for Modeling a Class of Fuzzy Objects", in *ACM Transactions on Graphics*, vol. 2, no. 2, April 1983, pp. 91–108. Their behavior is dynamic, and generally models the behavior of real objects in actual physical systems. Thus, their appearance is coherent and continuous from frame to frame in the motion video or film. Since they are paintbrushes, however, they implement dynamic paint operations, rather than acting as inert particles as in conventional particle systems.

The present invention provides a mechanism by which force parameters may be based on source image content, in accordance with user-supplied specifications. Thus, the forces controlling the paintbrushes may vary in response to changes in image content. Forces may also be permitted to diffuse throughout the display field in a controlled manner, if desired. The invention permits force and parameter definitions to be specified along derived, or abstract, channels as well as real channels. This enhances the flexibility with which paintbrush attributes can be defined.

Additionally, the present invention provides a vector diffusion system and method to capture user gestures, or strokes, and transform them into forces. This technique permits the user to specify complex force attributes in an intuitive and artistic manner.

The present invention reduces the problem of temporal discontinuities in paintbrush attributes by providing configurable attribute inertia for paintbrushes, which acts as an impulse response filter on paintbrush attributes.

DESCRIPTION OF THE PREFERRED EMBODIMENT

The Figures depict preferred embodiments of the present invention for purposes of illustration only.

Figure 1:
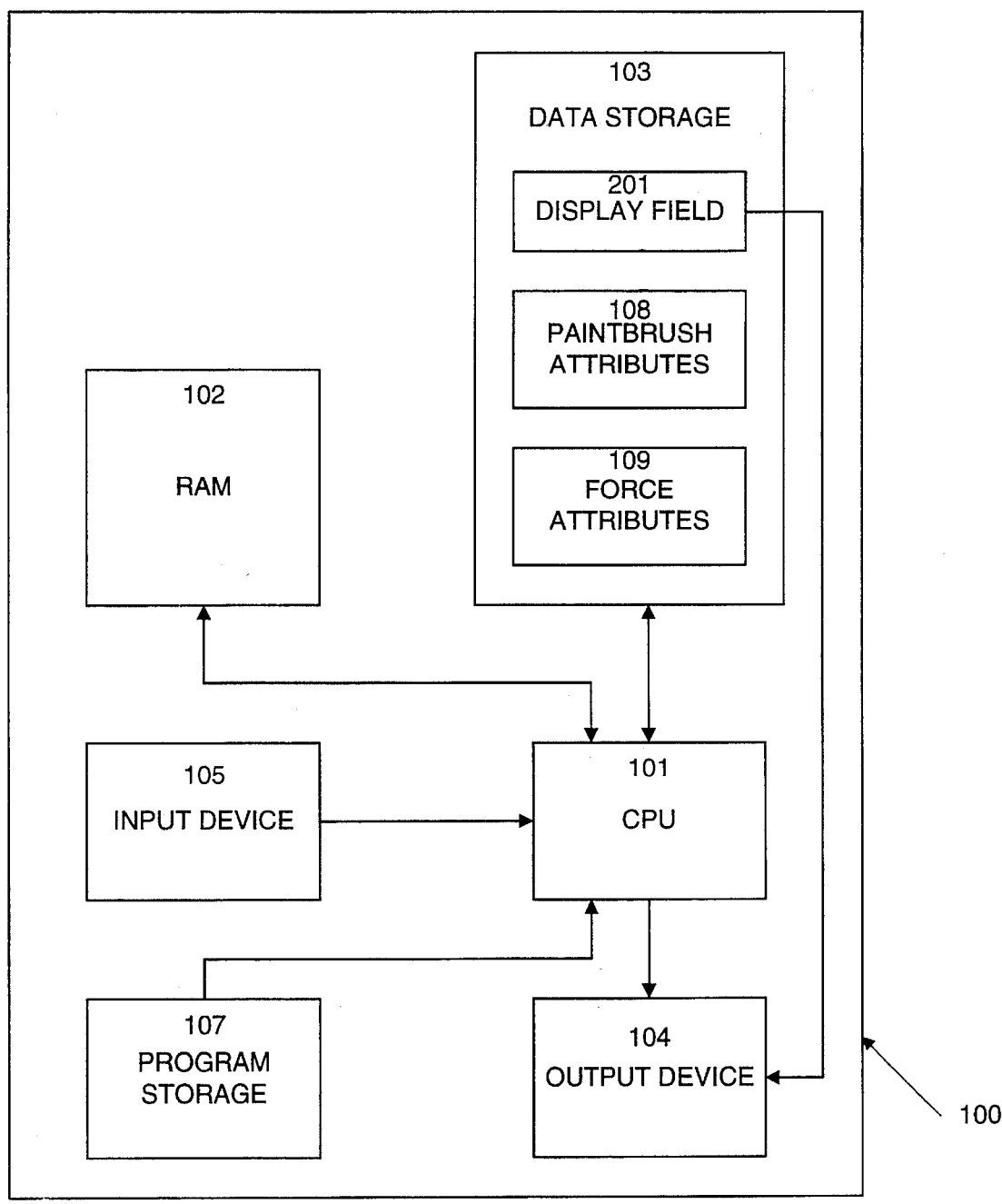
FIG. 1 is a block diagram of an implementation of the present invention.

Referring now to FIG. 1, there is shown a block diagram of the hardware elements of a typical implementation of dynamic image processing system 100 in accordance with the present invention. Source images may be supplied to system 100 using one or more input devices 105 (such as a video camera), or may be read from data storage 103 (such as a disk). The user may supply commands to system 100 via one or more input devices 105 (such as a keyboard and/or mouse). Central processing unit (CPU) 101 runs software program instructions, stored in program storage 107, which direct CPU 101 to perform the various functions of system 100. Data storage 103 may contain source images, as well as effects parameters and other data. In particular, data storage 103 contains a representation of display field 201, as well as paintbrush attributes 108 and force attributes 109.

The inventive aspects of this invention lie primarily in the software instructions that control the hardware elements shown in FIG. 1. In accordance with these software instructions, CPU 101 accepts input from input device or devices 105, accesses data storage 103, and uses random access memory (RAM) 102 (and particularly display field 201) in a conventional manner as a workspace, to process images and generate output on output device 104. CPU 101, RAM 102, data storage 103, output device 104, input device 105, and program storage 107 operate together to provide a dynamic image processing system 100. It has been found preferable to provide system 100 according to an object-oriented software environment.

In the embodiment illustrated herein, CPU 101 can be a mainframe computer or a powerful personal computer or workstation; RAM 102 and data storage 103 are conventional RAM, read-only memory (ROM) and disk storage devices for the CPU; and output device 104 is a conventional means for either displaying or printing processed images, or sending the processed images to processed image storage (not shown) for later viewing.

The present invention employs an interactive particle system comprising a large number of virtual image processing elements, or paintbrushes, which react to virtual forces in a predictable manner. In general, a particle system is a collection of particles having attributes, such as mass and drag co-efficient. The particles act in a predictable manner, obeying laws of physics (or some variant thereof). It is known to use such particle systems in computer animation, as disclosed by Reeves, but it is not known to use paintbrushes as particles in a particle system.

Figure 2A:
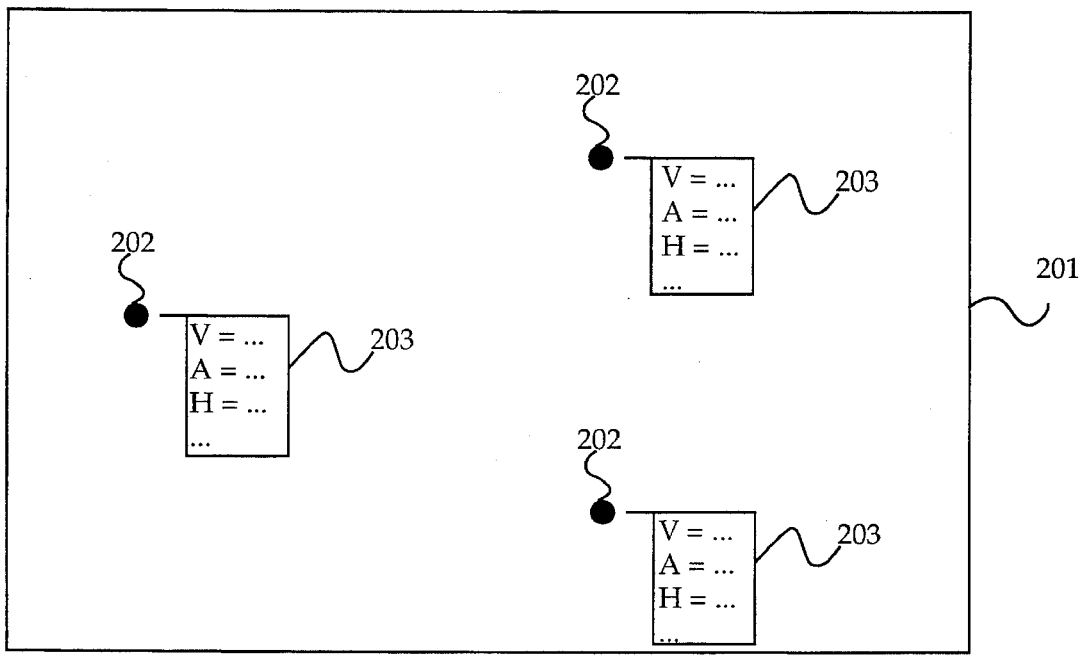
FIG. 2A is a sample diagram showing multiple particles in a display field.

The present invention treats paintbrushes as particles, and applies large numbers of these paintbrushes to images in order to create interesting effects. By providing predictable interactions between forces and paintbrush particles, the system of the present invention avoids noise amplification and sensitivity to temporal discontinuities in source images. Thus, the appearance of the processed image is coherent over time. Referring now to FIG. 2A, there is shown display field 201 with three particles 202. Display field 201 is a representation of the screen on which images will be displayed, as represented in data storage 103 for the purpose of performing image processing operations. Actual system output, as displayed on output device 104, is derived from the stored representation of display field 201. Particles 202 are virtual particles whose attributes are stored in particle attribute component 108 of data storage 103.

For purposes of illustration, the list of attributes for each paintbrush is shown alongside the corresponding particle; in the actual embodiment, the attributes are not normally displayed. A list of such attributes for each paintbrush is stored in data storage 103 of system 100, and may include:

Position ($\bar{P}$);

Size;

Orientation;

Color;

Drag coefficient;

Transparency (specifies transmission of color or light through the object);

Alpha value (specifies how much of a pixel is covered by the object);

Height;

Mass (M);

Shape;

Alpha roll-off function (a profile of the alpha value as a function of the distance from the paintbrush's center);

Height roll-off function (a profile of the height as a function of the distance from the paintbrush's center);

Life span (the length of time for which the paintbrush will exist);

Death probability (the probability that the paintbrush will cease to exist in a given time period); and Attribute inertia values for each of the above (this is described in detail below).

Other attributes may also be provided. Each attribute may be described in terms of a value or a function; accordingly, the attribute values may change with time, as will be described below. As the position attributes of the paintbrushes change, the paintbrushes move through display field 201. The paintbrushes move across the image being processed, in either two or three dimensions. As they move across the image, they act on it, performing transformations, generating new image elements, or altering existing image elements, in accordance with their attributes such as color, shape, and the like. Application of paintbrushes to images is done according to techniques known in the art, as described by Haeberli, as well as A. R. Smith, "Paint", *NYIT Technical Memo,* no. 7 (1978), and T. Cockshott et al, "Modelling the Texture of Paint", in *Eurographics,* vol. 11, no. 3 (1992), incorporated herein by reference.

Figure 2B:
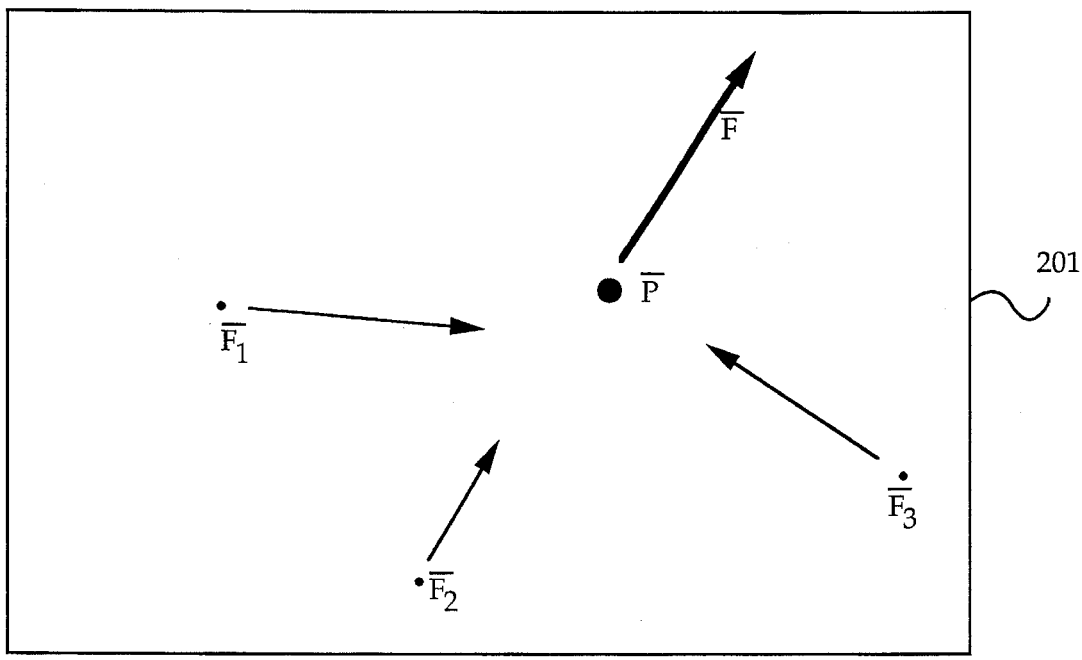
FIG. 2B is a sample diagram showing multiple forces in a display field.

The paintbrushes may behave as physical objects, and may move in response to virtual forces. Referring now to FIG. 2B, there is shown an example of display field 201 with three virtual forces. Virtual forces, such as $\bar{F}_1$, $\bar{F}_2$, and $\bar{F}_3$, are virtual objects in system 100 that, given a position $\bar{P}$ in display field 201, return force vectors. The object-oriented nature of system 100 is described in more detail below.

Force attributes are stored in force attribute component 109 of data storage 103. In the example of FIG. 2B, the three virtual forces are point forces; in the preferred embodiment, forces may be of any type, as will be described below. In FIG. 2B, the sum of the three force vectors returned by the three virtual forces yields force vector $\bar{F}$. Thus, the magnitude and direction of the net force on a particle at position $\bar{P}$ is represented by force vector $\bar{F}$. A paintbrush 202 at position $\bar{P}$ would therefore be subject to force vector $\bar{F}$, and the acceleration, velocity, and position of the paintbrush would be changed in response to the application of force vector $\bar{F}$. In this way, paintbrushes 202 approximate real-life behavior of physical objects, ensuring continuous movement throughout display field 201.

System 100 may provide abstract forces, which are forces defined in terms of other forces. One type of abstract force is a force list, which contains a set of forces $\{\bar{F}_1, \bar{F}_2, \ldots, \bar{F}_n\}$. Given a position $\bar{P}$, a force list returns a force $\bar{F}$, the magnitude and direction of which is determined by combining the effect of all forces $\{\bar{F}_1, \bar{F}_2, \ldots, \bar{F}_n\}$, in some predefined manner. A force list may simply perform a vector sum of all forces as they are exerted at position $\bar{P}$, or it may perform some more complex operation. Thus, in FIG. 2B, forces $\bar{F}_1$, $\bar{F}_2$, and $\bar{F}_3$ may be described as belonging to a force list that returns force $\bar{F}$.

Figure 3:
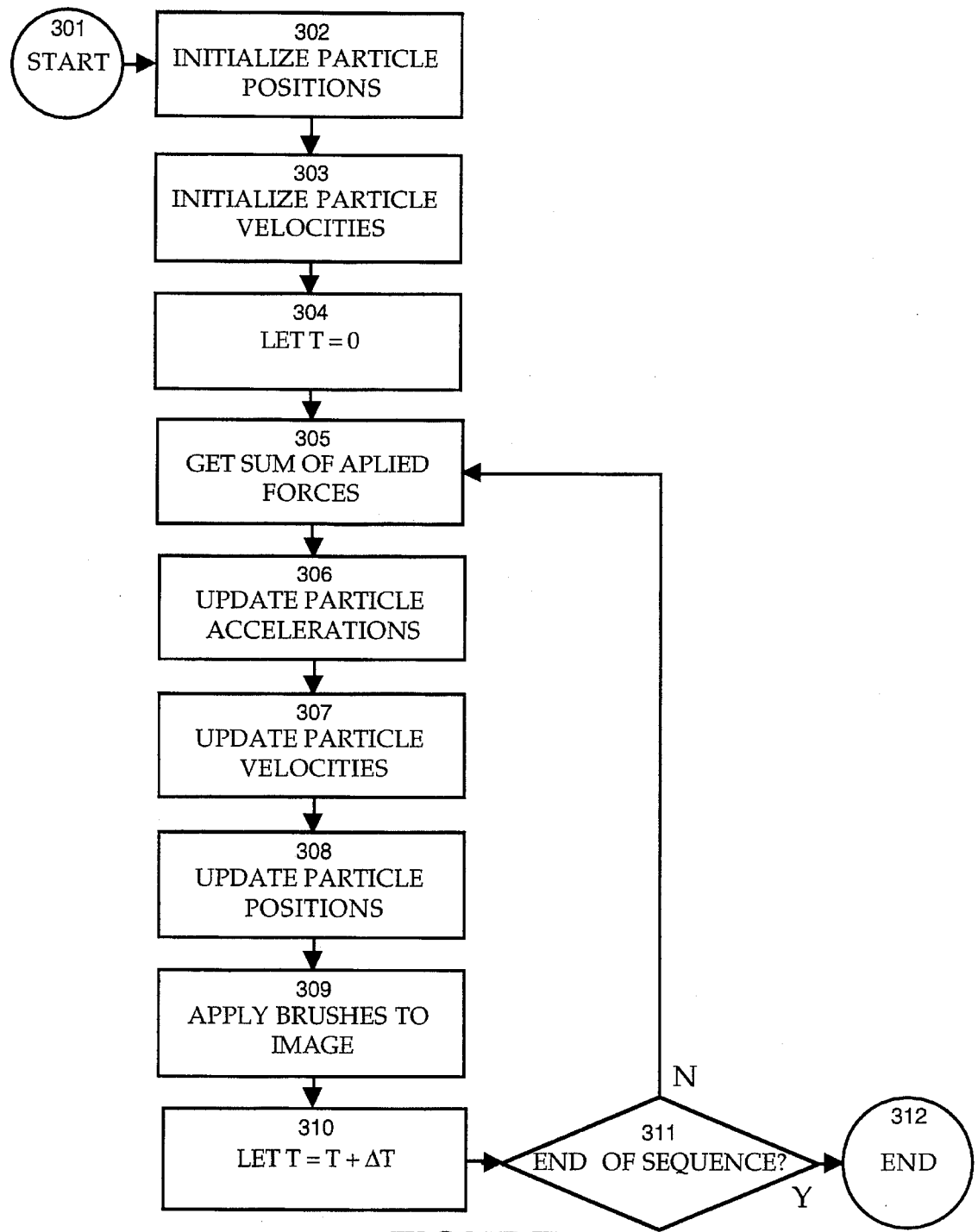
FIG. 3 is a flowchart showing a method of implementing paintbrushes as particles according to the present invention.

Referring now to FIG. 3, there is shown a flowchart illustrating the method of implementing paintbrushes as particles according to the present invention. First, system 100 initializes particle positions 302 and particle velocities 303. Additional attributes of particles may also be initialized at this time, as may be specified by the user. Time, represented by variable T, is set to zero 304. For each particle, system 100 then obtains a sum 305 of the applied forces at the position of the particle. The method by which this sum is obtained will be described below. Based on this sum, and on various attributes of particles (such as mass), system 100 updates particle accelerations 306. Acceleration may be updated using a simple Newtonian equation such as $\bar{A}=\bar{F}/M$, where $\bar{A}$ is the particle's acceleration vector, $\bar{F}$ is a vector representing the sum of the applied forces, and M is the mass of the particle. Other attributes, such as drag coefficient, may also affect the particle's acceleration. For each particle, system 100 updates the velocity 307 by adding $\bar{A}$ to the particle's current velocity $\bar{V}$. Thus, new $\bar{V}$=old $\bar{V}+\bar{A}$. Again, other attributes may also affect the velocity. System 100 then uses the particle's new velocity to update the particle's position 308 in display field 201 by adding $\bar{V}$ to the particle's current position $\bar{P}$. Other attributes of the particle may also change in response to the sum of the forces exerted at the particle's position.

As discussed above, each particle 202 represents a dynamic image processing element, or paintbrush, capable of affecting the image being processed. System 100 now applies paintbrushes 309 to the image, in accordance with each paintbrush's attributes (such as color, shape, and the like). Application of each paintbrush results in some sort of transformation to the image in the vicinity of the particle 202 representing the paintbrush. For example, a paintbrush might cause a blue triangle to appear at the appropriate location, or may increase local luminosity by some factor. Such transformations are known in the art, as described by Cockshott, as well as Smith, incorporated herein by reference. Once the paintbrushes have performed their transformations, system 100 increments the value of T 310 by a value ΔT, and checks to see whether the image sequence is finished 311. If it is finished, the process ends 312. If the image sequence is not finished, system 100 loops back to obtain a new sum of applied forces 305 for each particle. The processed image may be output on output device 104 as it is generated, or it may be stored in data storage 103 for later retrieval.

During the repeated execution of the above-described steps, certain particles may become extinct, and other particles may be born, in response to user specification of particle attributes. The techniques by which particle extinction and birth occur are well known in the art, as described by Reeves.

Figure 4:
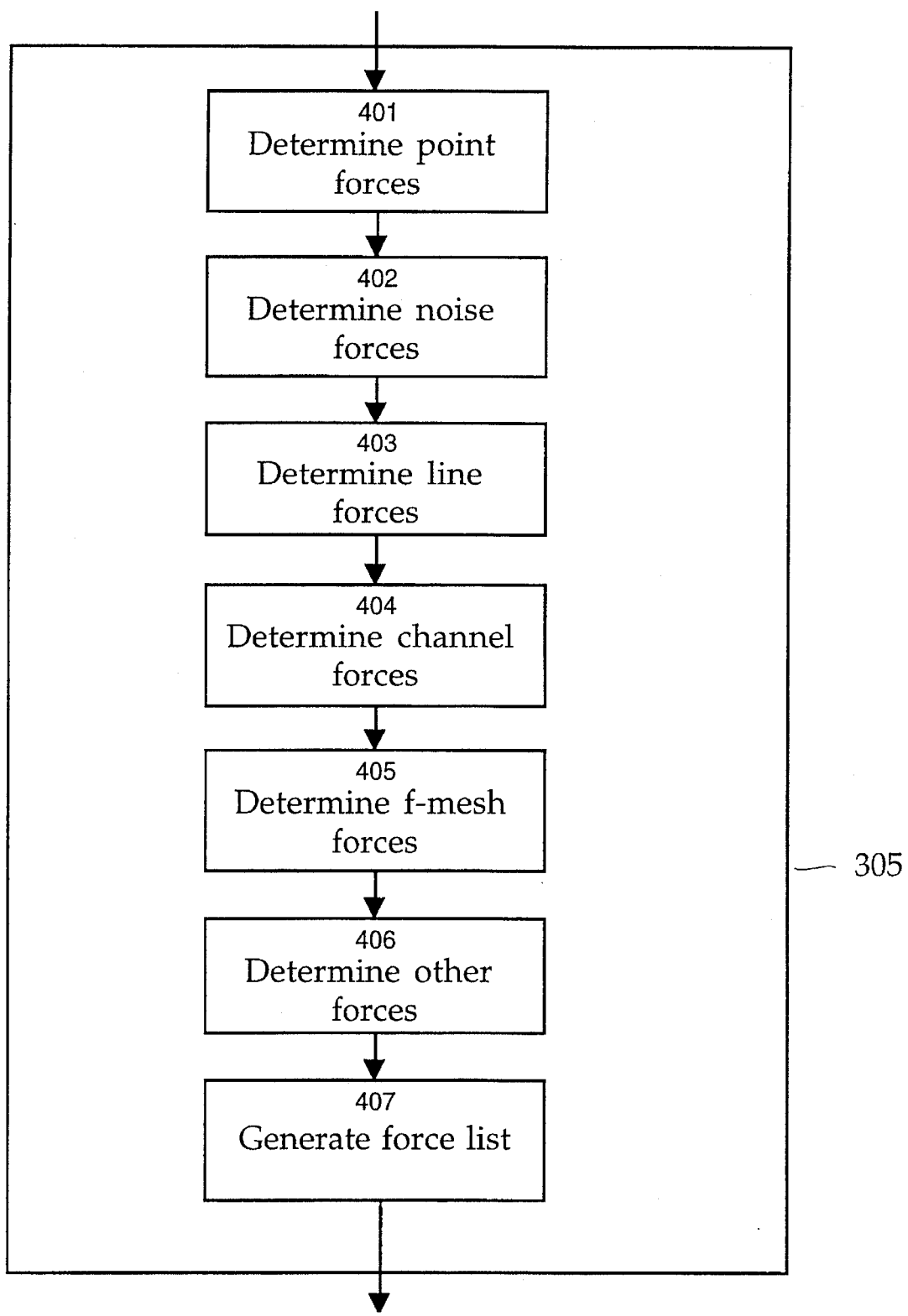
FIG. 4 is a flowchart showing a method of obtaining a sum of applied forces according to the present invention.

Referring now to FIG. 4, there is shown a flowchart illustrating the method of obtaining a sum of applied forces 305 according to the present invention. System 100 determines the magnitude and direction for each type of force acting on a given particle. For the given particle, it determines point forces 401, noise forces 402, line forces 403, channel forces 404, f-mesh forces 405, and other forces 406. Each of these types of forces will be described below. These forces are used to generate a force list 407. Given the position of a particle (such as $\bar{P}$), the force list returns a force $\bar{F}$ representing the sum of all forces acting at the particle's location.

Point Forces

Figure 5A:
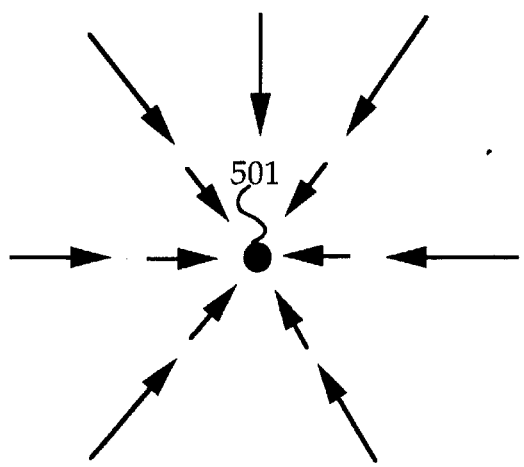
FIGS. 5A, 5B, and 5C are diagrams of sample point forces.
Figure 5B:
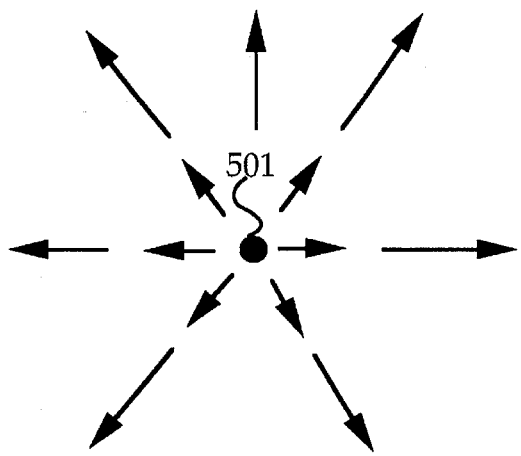
Figure 5C:
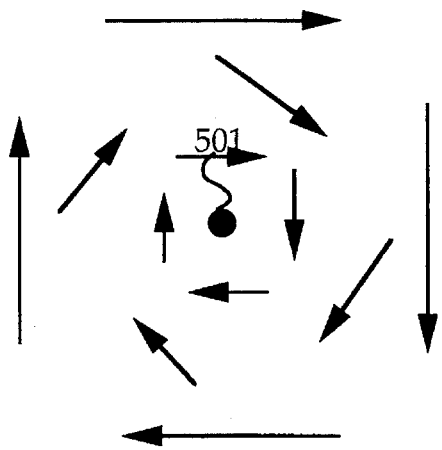

Referring now to FIGS. 5A, 5B, and 5C, there are shown three examples of point forces. A point force radiates from a given origin 501 in display field 201. The force's orientation may be radial (as in FIGS. 5A and 5B) or orbital (as in FIG. 5C) with respect to the origin. Its magnitude may vary depending on the distance from the origin. One common type of point force is a radially oriented force that has a magnitude inversely proportional to the square of the distance from the origin; such a force simulates a gravitational effect.

The origin of a point force may move in response to other forces, or in response to user parameters. The origin may be a particle, having mass, velocity, and acceleration as do other particles. The attributes of the origin may vary in response to local image content in the region of the origin.

In the preferred embodiment, point forces are created by a routine called createPointForce. The user calls createPointForce with a command such as:

createPointForce (p={0.5,0.5}, profile=gaussfunction, mag=1.2, ang=0, radius=0.7, rmod=3), where:

p specifies the position of the origin, profile specifies the attenuation of the force as a function of the distance from the origin, mag is a scaling factor that specifies the maximum magnitude of the point force, ang specifies the angle to rotate the resultant force vector, radius specifies the radius of effect of the force (i.e., the maximum distance from the origin at which the force can be exerted), and rmod specifies the hysteresis to apply to the resultant force vector (this causes the vector to snap to an angle; for example, given an rmod of x, and an vector orientation angle A, the force vector's orientation will snap to an angle A' defined as A'= A mod (2π/x)).

Any of the parameters may be described in terms of a value or a function.

Noise Forces

Figure 6:
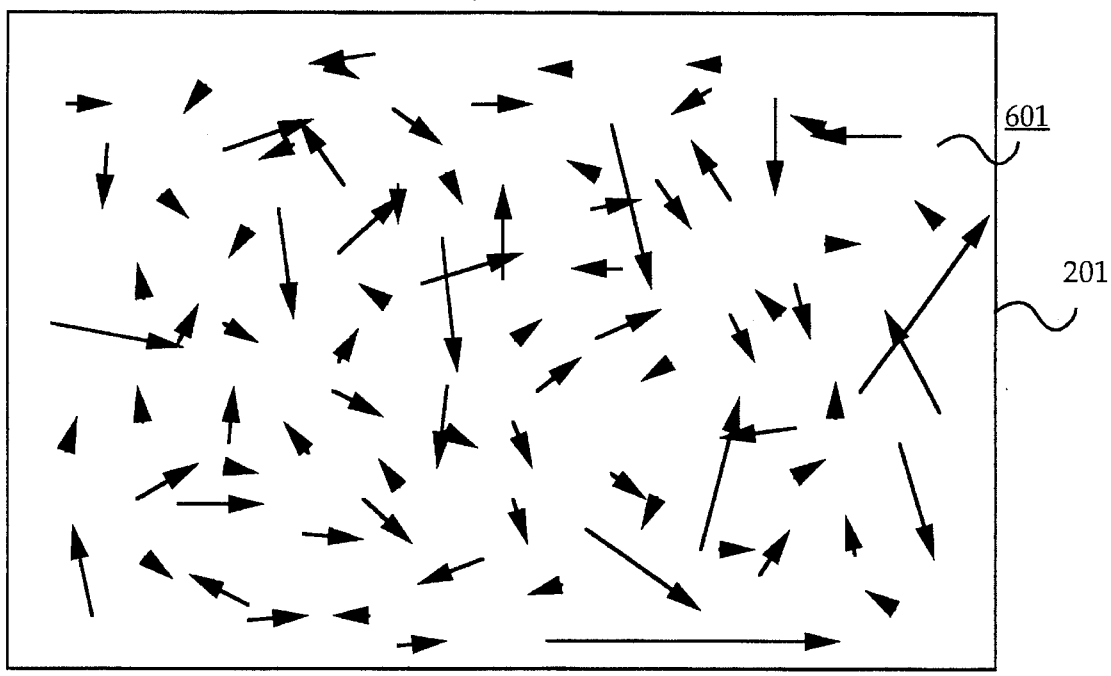
FIG. 6 is a diagram of a sample noise force.

Referring now to FIG. 6, there is shown an example of a noise force 601 within display field 201. A noise force generates a random force vector at a given location. The noise force is subject to parameters and limitations that may be specified by the user in stochastic terms. For example, the magnitude and/or orientation of the force may be defined in terms of a probability distribution centered about a given value. Furthermore, the noise force may be limited to a portion of display field 201, and may vary in response to changes in the image. The random element for a noise force is typically generated using a harmonic series with random coefficients. For example:

$$fx = \sum_{i=1}^{n} \frac{a_i \cos nx}{n} \qquad \text{(Eq. 1)}$$

where:

fx is the desired random function, n is the depth of recursion, and $a_i$ represents the random coefficients.

In the preferred embodiment, noise forces are created by a routine called createNoiseForce. The user calls createNoiseForce with a command such as:

createNoiseForce (mag=0.7, xsize=100, ysize=100, ang= 0.35, depth=7), where:

mag is a scaling factor that specifies the magnitude of the noise force, xsize and ysize specify the spatial extent of the noise force (i.e., how large an area of display field 201 is to be covered), ang specifies the angle to rotate the resultant force vector, and depth specifies the depth of recursion for the randomness function.

Any of the parameters may be described in terms of a value or a function.

Line Forces

Figure 7:
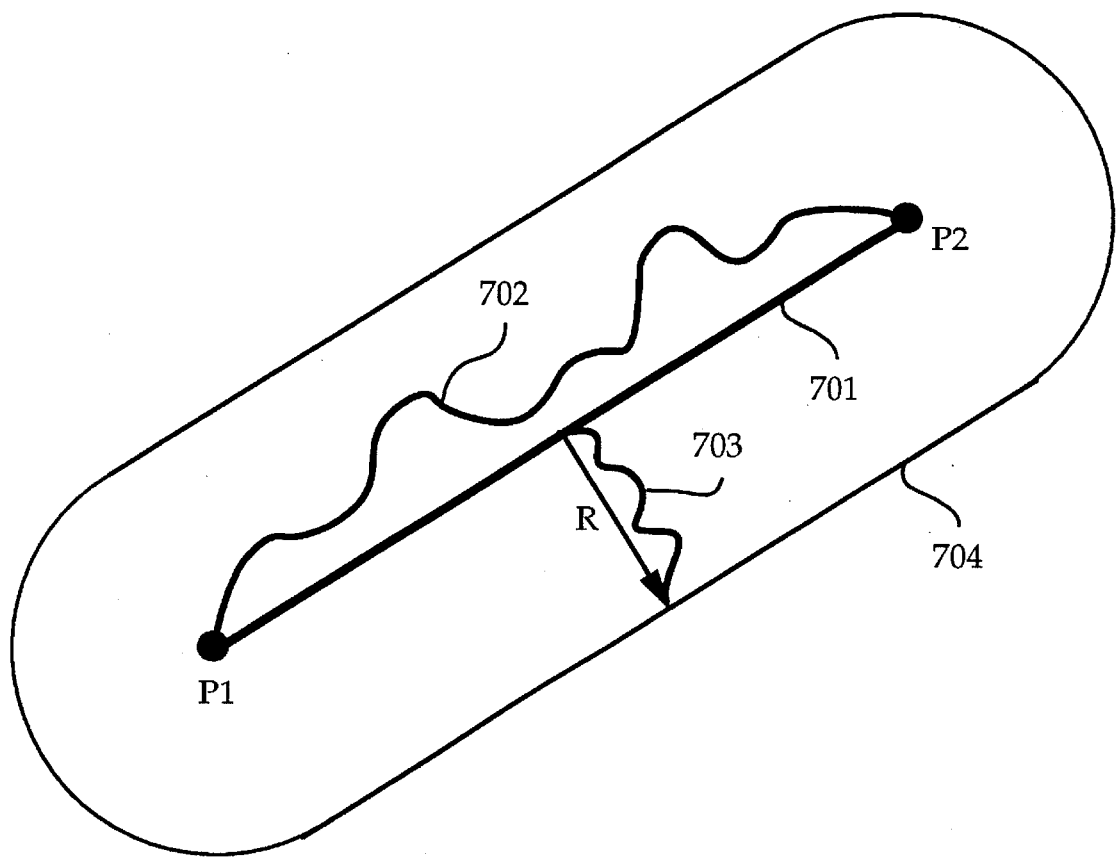
FIG. 7 is a diagram of a sample line force.

Referring now to FIG. 7, there is shown an examples of a line force. A line force is similar to a point force, except that it radiates from a line segment origin 701 rather than a point origin. Its effect on a particle at a particular position depends on a length profile function 702 and a radial profile function 703. Thus, the magnitude and orientation of force exerted on a particle may vary dependent on the distance from the line, as well as the position along line segment 701. A line force has radius of effect R; particles outside the area of effect 704 defined by radius R are not affected by the line force. An analog to the gravitational point force described previously is a gravitational line force, which would be oriented perpendicular to the line and would have a magnitude inversely proportional to the square of the distance from the origin.

As with point origins, the line origin may move in response to other forces, or in response to user parameters. It may even be a particle, having mass, velocity, and acceleration. Finally, the attributes of the line origin may vary in response to local image content in the region of the line.

In the preferred embodiment, line forces are created by a routine called createLineForce. The user calls createLineForce with a command such as:

createLineForce (p1={0.5,0.5}, p2={0.7,0.1 }, profile= gaussfunction, mag=1.2, ang=0, radius=0.7, rmod=3, lengthprofile= constfunction), where:

p1 and p2 specify the endpoints of the line segment, profile (703) specifies the attenuation of the force as a function of the distance from the line, mag is a scaling factor that specifies the maximum magnitude of the line force, ang specifies the angle to rotate the resultant force vector, radius (R) specifies the radius of effect of the force (i.e., the maximum distance from the line segment at which the force can be exerted), rmod specifies the hysteresis to apply to the resultant force vector, and lengthprofile (702) specifies the attenuation of the force as a function of the position along the length of the line segment.

Any of the parameters may be described in terms of a value or a function.

Channel Forces

A channel force is a particular type of force whose magnitude and direction depend on a particular channel C of the image. A channel is a variable image parameter, representing an axis along which some real or abstract characteristic of the image may vary. Real channels are those for which the data describing the channel's value and available for use by system 100 are stored in an array. Examples of real channels are: red value, blue value, green value, hue value, saturation value. Derived, or abstract, channels are those which are defined as an operator on one or more other channels. Examples of abstract channels are: height (virtual z-value), orientation, size, stochastic attribute control. Their values are not stored, but are calculated based on other channels.

By providing channel forces, system 100 is able to generate forces whose attributes vary with the content of the image being processed. Channel force attributes may depend on any channel or combination of channels. Given a position $\bar{P}$, a channel force returns a force $\bar{F}$ whose magnitude and direction is based on the gradient of channel C (or channel combination C) at position $\bar{P}$. The gradient ($\bar{\nabla}$) of channel C is a vector equal to, and in the direction of, the maximum space rate of change in the magnitude I of channel C at position $\bar{P}$. Thus, described in rectangular coordinates, $$\text{grad}(C_P) = \nabla(C_P) = \left[ \frac{\partial I}{\partial X_P}, \frac{\partial I}{\partial Y_P} \right]. \quad \text{(Eq. 2)}$$

Figure 8A:
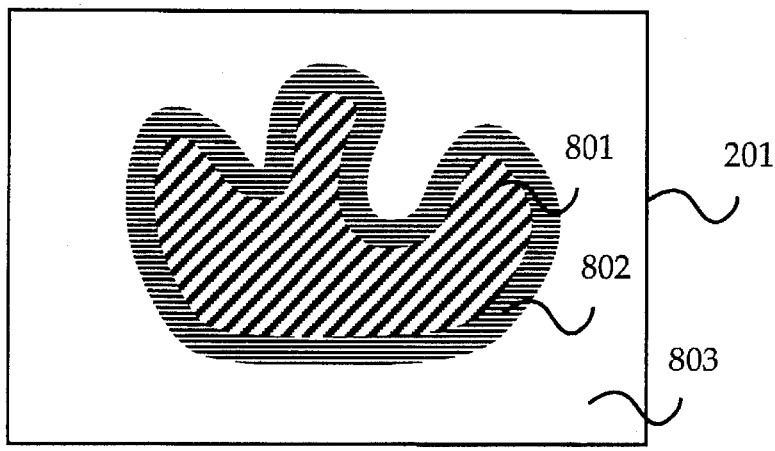
FIGS. 8A, 8B, and 8C are diagrams showing a method of transforming a sample image into a channel force.
Figure 8B:
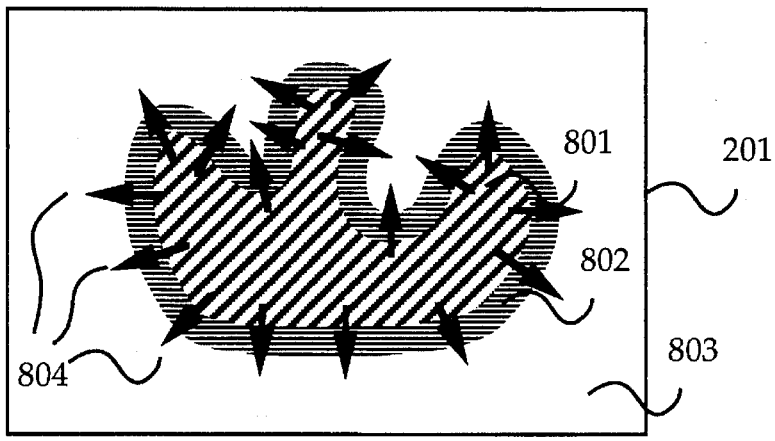
Figure 8C:
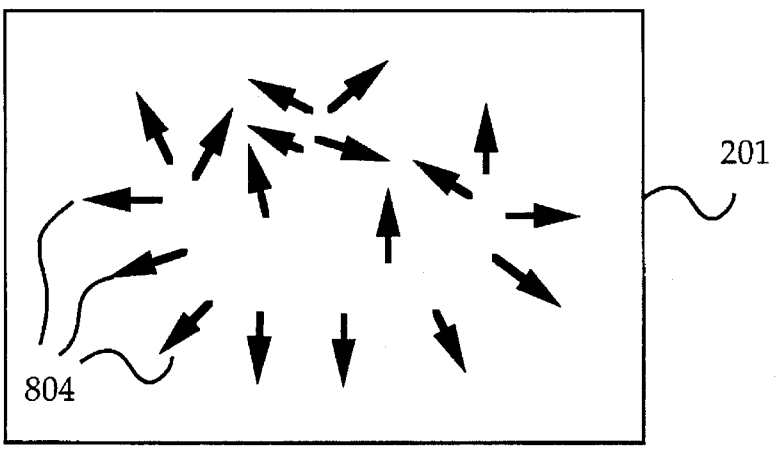

Referring now to FIGS. 8A, 8B, and 8C, there is shown an example of a channel force based on a luminosity channel. FIG. 8A shows a sample image in display field 201, comprising a shape 801, a background area 803, and a boundary 802 between shape 801 and background 803. Shape 801 has relatively low luminosity, boundary 802 has intermediate luminosity, and background 803 has relatively high luminosity. FIG. 8B shows how the luminosity channel of the image is transformed into a series of force vectors 804. Each force vector 804 is based on the gradient of the luminosity channel in the locality of the vector 804. Thus, force vectors 804 exert force in an outward direction from the interior of shape 801. FIG. 8C shows force vectors 804 without the underlying image. Although a fixed number of force vectors 804 are shown, there may actually be a continuous channel force along the entire boundary 802, which would be exerted on any particle at or near boundary 802.

Figure 9:
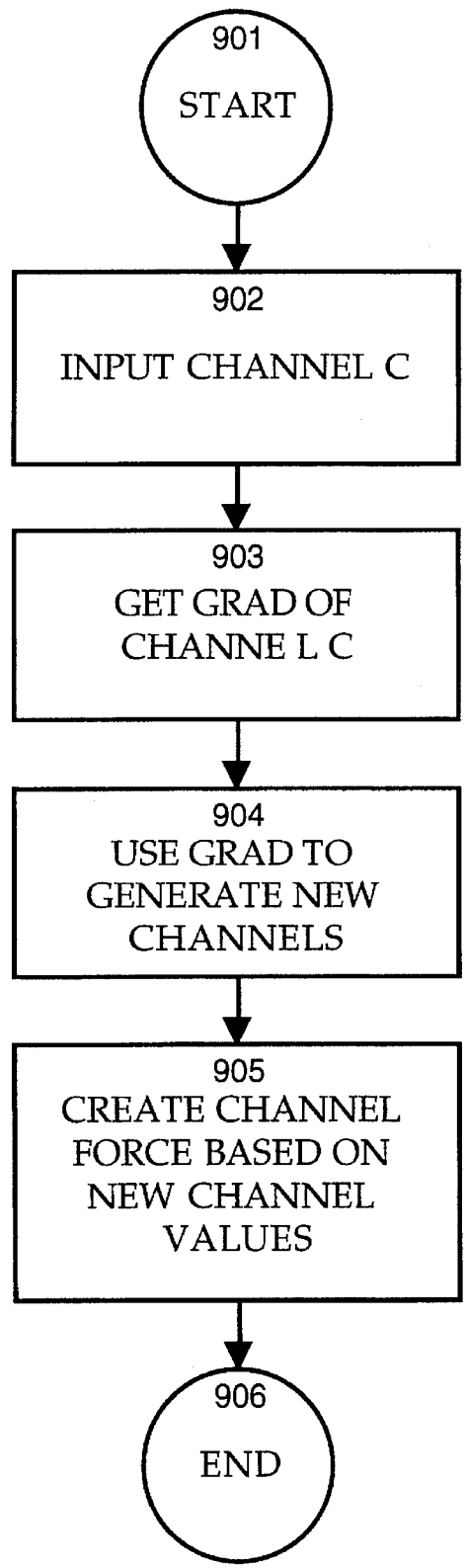
FIG. 9 is a flowchart showing a method of generating channel forces according to the present invention.

Channel forces are generated by creating new channels representing the gradient of selected channel C. As with any vector, the gradient may be described in terms of its X and Y components, or in terms of its magnitude and orientation. Thus the new channels may either 1) represent the partial derivatives of C along the X and Y axes, respectively; or 2) represent the magnitude and orientation of the gradient of C. Referring now to FIG. 9, there is shown a flowchart illustrating the method of generating channel forces according to the present invention. System 100 gets an input channel C 902 that may be real, abstract, or a combination of two or more channels. It determines the gradient of channel C 903, and uses the gradient to generate two new channels 904. As described above, the new channels may represent partial derivatives, or magnitude and orientation. System 100 then creates a channel force 905 based on the new channels, and the channel force becomes part of the force list for application to particles.

The result of this technique is that the behavior of particles, and paintbrushes in particular, can be made responsive to the content of the image.

In the preferred embodiment, channel forces are created by a routine called createChannelForce. The user calls createChannelForce with a command such as:

createChannelForce (channel=C, mag=1.2), where:

channel specifies the channel on which the channel force will be based, and mag is a scaling factor that specifies the maximum magnitude of the channel force.

F-mesh Forces

Figure 10:
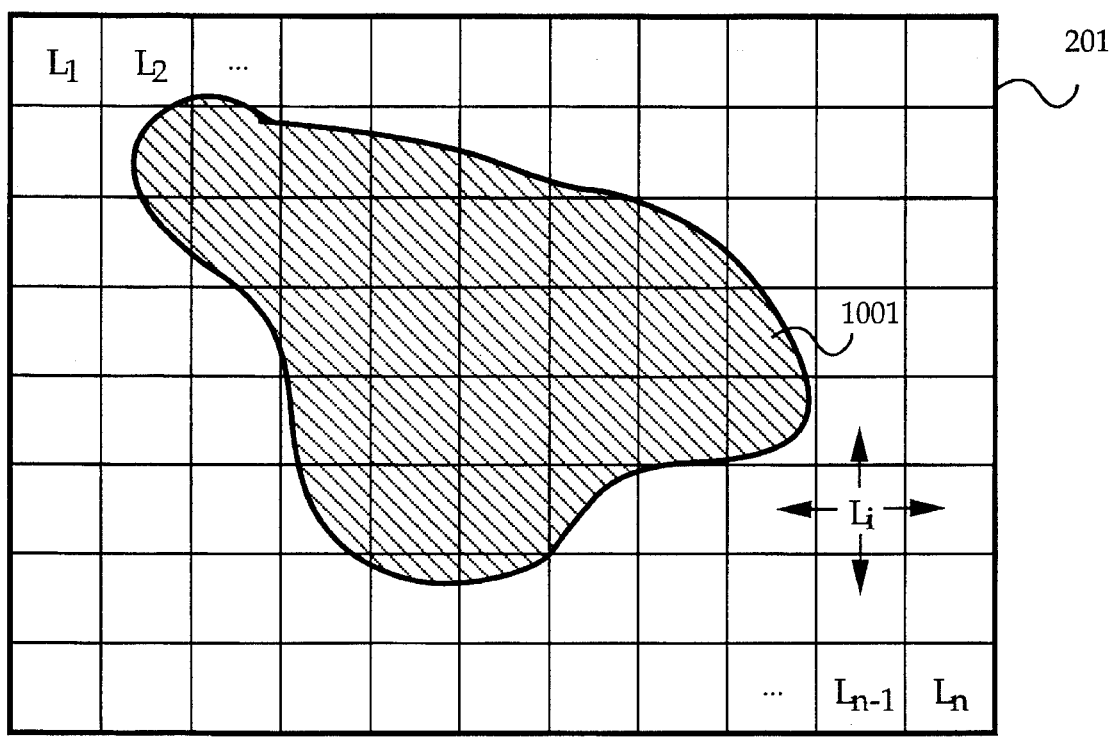
FIG. 10 is a diagram showing an example of an f-mesh according to the present invention.

F-mesh forces provide another mechanism for making particle behavior responsive to image content. Referring now to FIG. 10, there is shown an example of an f-mesh. Display field 201 is shown with an image 1001. A discrete, finite mesh of cells $L_1, L_2, \ldots, L_n$ is provided. In the example of FIG. 10, the mesh is two-dimensional, although in the preferred embodiment it may be of any dimension. Each cell $L_i$ carries a number of properties, which may include:

$P_i$=a pressure value;

$\Delta P_i$= a change in pressure from time T to time T+$\Delta$T;

$D_i$= a diffusion coefficient, representing the relative amount by neighbor cell properties may "leak" into the cell ($D_i$ may be a vector, indicating a particular direction of "leakage"); and $R_i$= a radiation coefficient, representing the relative amount by which the cell's properties may fade away.

The cell may also carry other properties. The initial values of these properties may be "seeded" by the user, or may be based on image content at the locality of each cell. Additionally, seeding of properties may occur at any time during operation of system 100. Seeding is done by supplying an external input $E_i$ to the cell, as will be described in more detail below.

Figure 11:
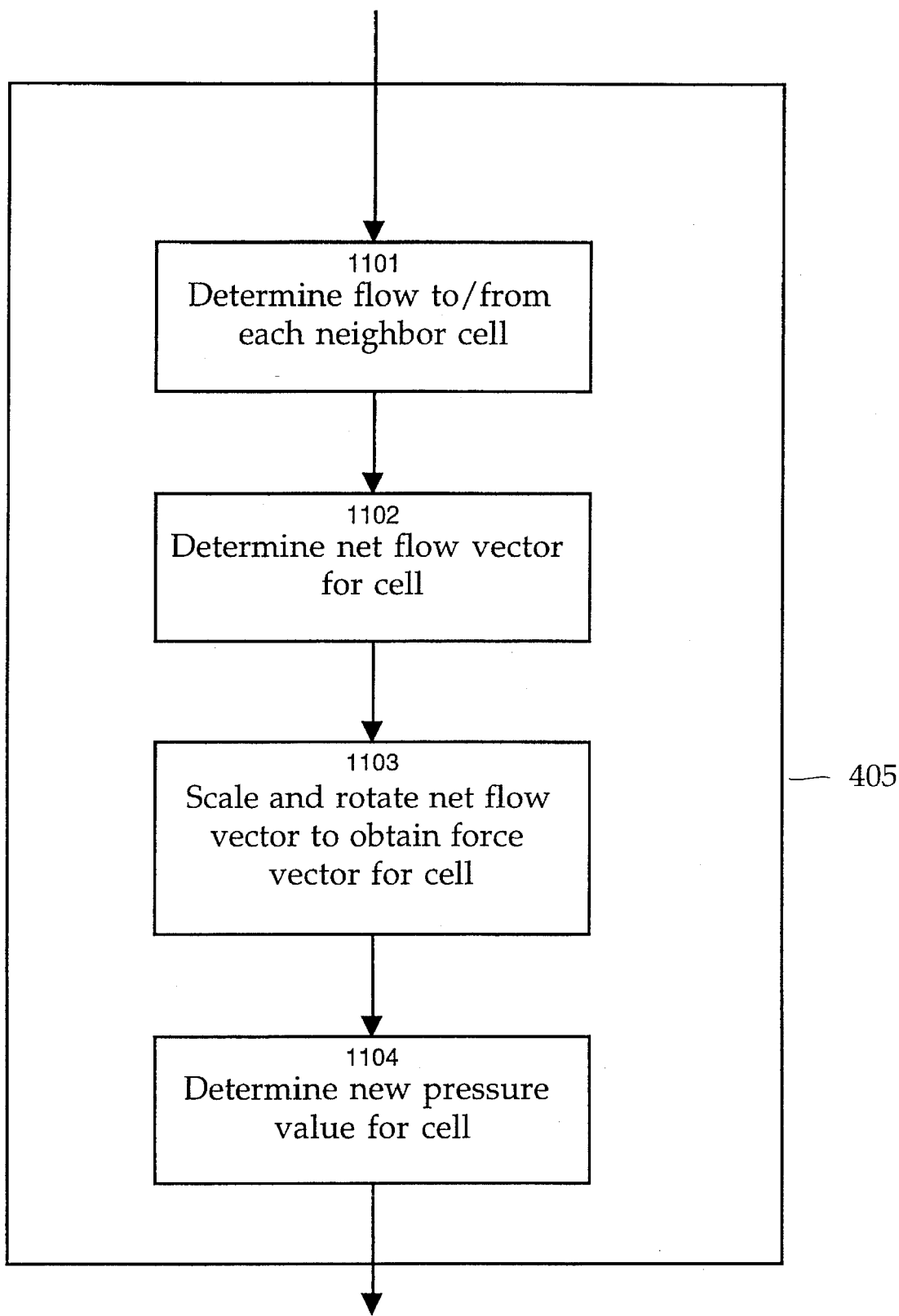
FIG. 11 is a flowchart showing a method of determining f-mesh forces and updating f-mesh properties according to the present invention.

Each cell in the f-mesh generates a force whose magnitude and orientation depend on pressure differentials between the cell and each of its neighbors. A cell's force acts on particles within its locality in display field 201. During each time-step $\Delta T$ of processing, f-mesh forces are determined 405 and f-mesh properties are updated. Referring now to FIG. 11, the cell determines a series of flow values 1101 representing the flow to or from each of its neighbor cells. The flow to or from a neighbor cell is equal to the difference in the pressures of the two cells, scaled by the diffusion coefficient. Thus, $$\text{Flow from cell } i \text{ to cell } k = (P_i - P_k) * D_i \qquad \text{(Eq. 3)}$$

This flow is expressed in terms of a flow vector, whose magnitude is equal to the flow value and whose direction is perpendicular to the boundary between the two cells, pointing towards the cell having a lower pressure value.

System 100 then determines a net flow vector for the cell 1102 by performing a vector sum of all the flow vectors going into and coming out of the cell. It then scales and rotates the net flow vector 1103 in accordance with user-supplied parameters such as mag, ang, and rmod (as described above in connection with other force types), to obtain a force vector $\bar{F}$ for the cell. This force will be applied to any paintbrushes or other particles within the cell.

Additionally, system 100 provides for diffusion and radiation of cell properties into neighboring cells, so that pressures and forces "travel" throughout display field 201. Thus, f-meshes provide a mechanism by which a force's influence may be exerted in remote areas of display field 201, resulting in changes in distant paintbrushes without any direct inter-particle operations. With each time-step $\Delta T$, system 100 determines a new pressure value for each cell 1104. This is done by determining a pressure change value $\Delta P_i$ from the arithmetic sum of the net flows into and out of the cell. Thus, $$\Delta P_i = \Sigma(\text{net flows}) = \sum_{k \in N_i} (P_k - P_i) D_i, \qquad \text{(Eq. 4)}$$

where $N_i$ is the set of neighbor cells immediately adjacent to cell $L_i$.

System 100 then determines 1102 a new pressure value $P_i$ by applying the formula:

$$P_i(\text{new}) = P_i(\text{old}) + \Delta P_i - R_i + E_i \qquad \text{(Eq. 5)}$$

where $E_i$ is an external input, generally based on local image properties at the cell's location in display field 201. $E_i$ is not stored as a property of the cell; rather, it is typically supplied as a function definition. Thus, the pressure value of cell $L_i$ is affected by the pressure value of neighbor cells, the radiation value $R_i$, and external input $E_i$.

Any particle within the locality of cell $L_i$ is subject to a force generated by that cell of the f-mesh. In order to avoid discontinuities at cell boundaries, if desired, the force may be made to vary depending on the location of the particle within cell $L_i$, so that force attributes at a particular point within cell $L_i$ depend on the pressure value of cell $L_i$ as well as the pressure values of adjacent cells. This is done by considering the cell's force vector $\bar{F}$ to apply at the lower-left corner of the cell. For any other location within the cell, the force vector is determined by interpolating using the four force vectors immediately surrounding the location. Interpolation may be performed using conventional bilinear or bicubic techniques.

Figure 15A:
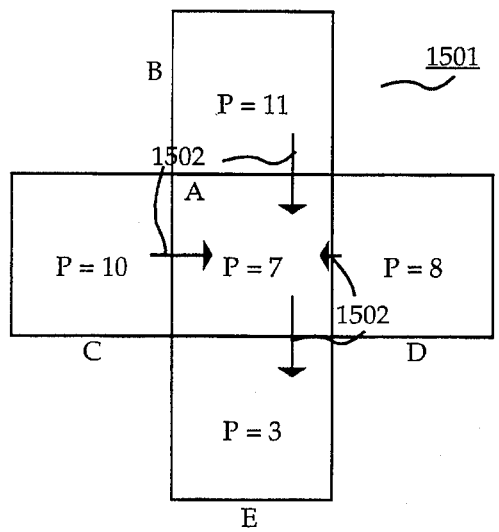
FIGS. 15A, 15B, and 15C are diagrams showing an example of a method of forming force vectors from pressure differentials in an f-mesh.

Referring now also to FIG. 15A, there is shown an example of a group of cells 1501 comprising cell A and its neighbor cells B, C, D, and E. Each cell has a pressure value, indicated in the Figure in the center of the cell. Force vectors 1502 are proportional to the pressure differences between cell A and each of the neighbor cells. Thus, force vector 1502 between cell A and cell E has a magnitude four times that of force vector 1502 between cell D and cell A, since the pressure differential between cell A and cell E is 4, while the pressure differential between cell D and cell A is 1.

Figure 15B:
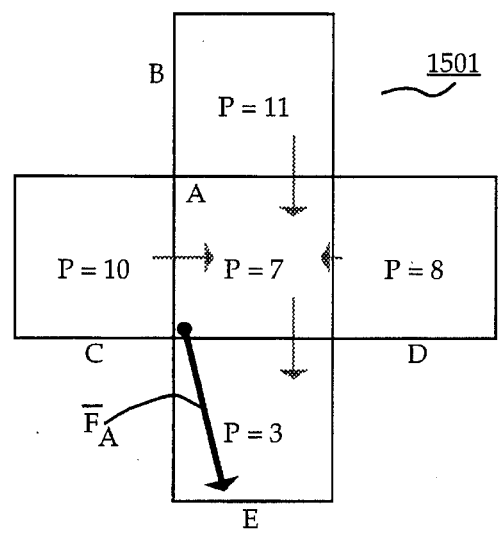

Referring now to FIG. 15B, force vector $\bar{F}_A$ is determined by performing a vector sum of the four force vectors 1502. This force vector will be applied to any particles within cell A.

Figure 15C:
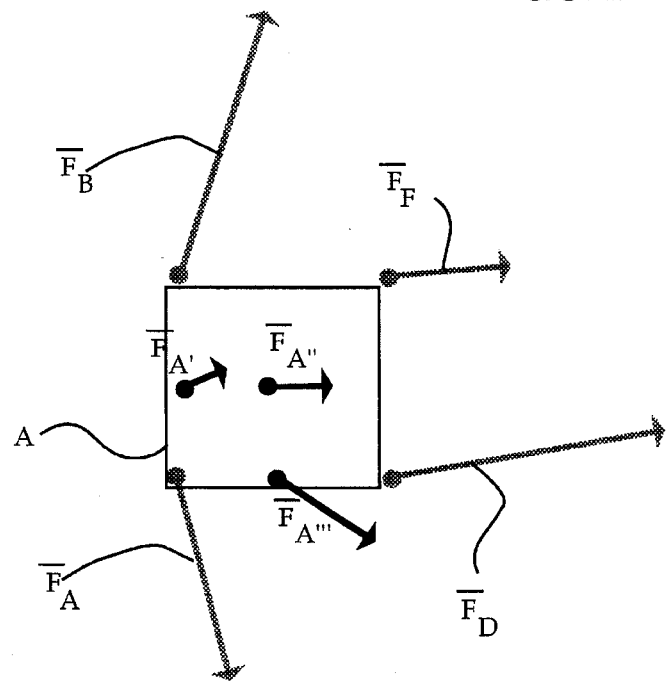

Referring now to FIG. 15C, there is shown an example of the method of varying the force exerted within cell A in order to avoid discontinuities at cell boundaries. The forces exerted at three different locations within cell A are indicated as $\bar{F}_{A'}$, $\bar{F}_{A''}$, and $\bar{F}_{A'''}$. Each of these force vectors is determined by conventional interpolation using the four surrounding force vectors $\bar{F}_A$, $\bar{F}_B$, $\bar{F}_D$, and $\bar{F}_F$.

By varying cell size, seed values, diffusion values, and radiation values, the user may control the behavior of f-mesh forces to generate many different types of effects. Additionally, flow vectors between cells may be combined in ways other than taking a vector sum, in accordance with user specification.

Figure 13A:
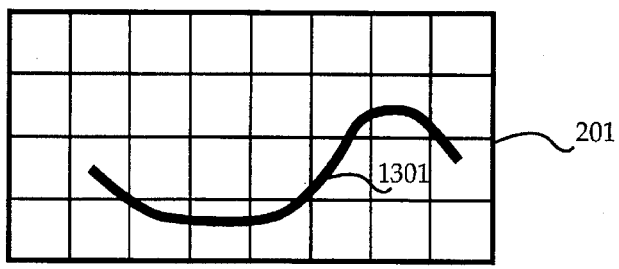
FIGS. 13A, 13B, 13C, 13D, and 13E are diagrams showing an example of a method of transforming stroke input into forces in an f-mesh.
Figure 13B:
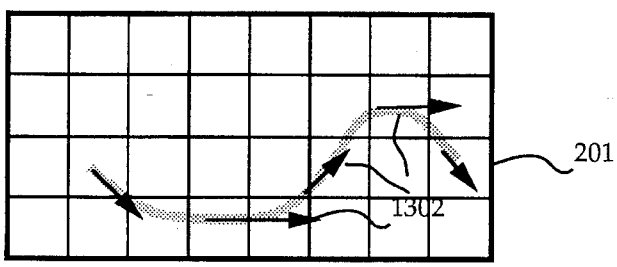
Figure 13C:
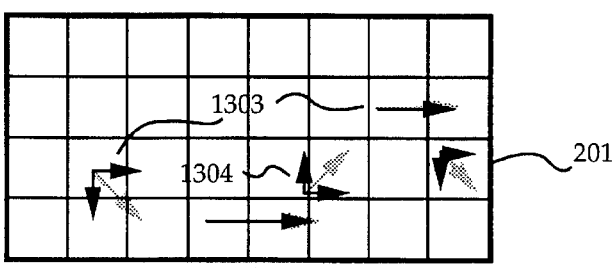
Figure 13D:
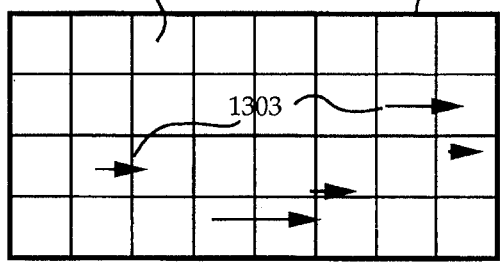
Figure 13E:
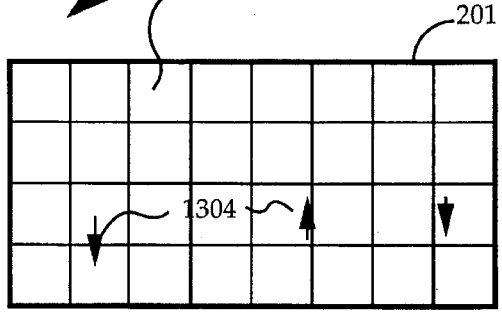
Figure 14:
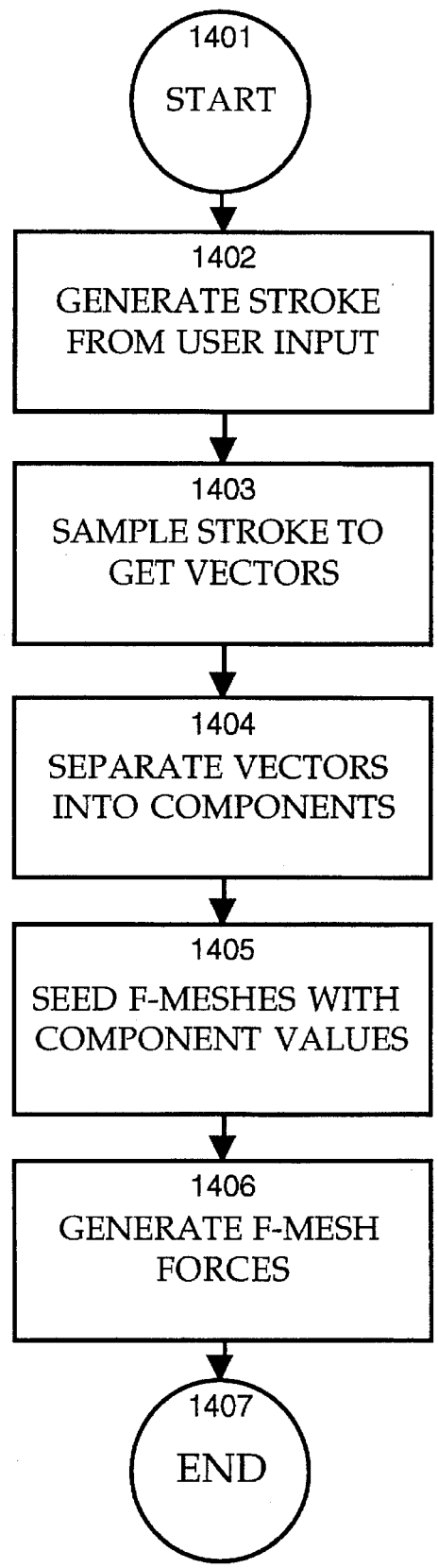
FIG. 14 is a flowchart showing a method of transforming stroke input into forces in an f-mesh.

In a technique known as vector diffusion, f-meshes may also be used to capture user gestures and transform them into forces. Referring now to FIG. 14, there is shown a method of transforming user gestures into forces. Referring also to FIGS. 13A through 13E, there is shown an example of this technique. The user supplies a gesture, or stroke input, via some input device 105 such as a mouse, and system 100 converts 1402 this input into stroke 1301 using techniques that are known in the art. System 100 then samples 1403 stroke 1301 to obtain a series of vectors 1302 along the length of stroke 1301. In the example of FIG. 13B, these vectors are two-dimensional, but they may be three-dimensional or n-dimensional. System 100 then separates 1404 vectors 1302 into their components. In the two-dimensional example, each vector 1302 has an x-component 1303 and a y-component 1304. System 100 then seeds 1405 a number of f-meshes with these component values. In the two-dimensional example, two f-meshes 1305 and 1306 are used. F-mesh 1305 is seeded with x-components 1303, and f-mesh 1306 is seeded with y-components 1304. These component values act as external input values $E_i$ for cells in each f-mesh, as described above. System 100 then generates 1406 f-mesh forces using techniques described previously, including diffusion, radiation, and the like. The f-mesh forces generated by the f-meshes are then applied to particles, such as paintbrushes, in display field 201. In the two-dimensional example, the component vectors may be added together, or otherwise combined.

The above-described vector diffusion technique allows user gestures, or stroke input, to be transformed into f-mesh forces in a manner that is intuitive and artistic from the user's point of view. By controlling f-mesh parameters and attributes, the user can use vector diffusion to create many interesting effects based on stroke input.

Alternatively, instead of a user stroke input, velocities of computer-generated animation objects may be used to generate strokes. Thus, a sample stroke 1301 as shown in FIG. 13A might be based on computer-generated animation objects. This technique facilitates a form of interaction between conventional synthetic computer animation and particle-based dynamic image processing technology.

In the preferred embodiment, f-mesh forces are created by a routine called createFmesh. The user calls createFmesh with a command such as:

createFmesh (name="fred", nsize=27, msize=27, mag= 1.2, ang=0, rmod=3, radiate=0.01, diffuse=0.1, clamp_edges), where:

name specifies the name of the f-mesh, nsize specifies the number of cells in the x direction, msize specifies the number of cells in the y direction, mag is a scaling factor that specifies the maximum magnitude of the line force, ang specifies the angle to rotate the resultant force vector, rmod specifies the hysteresis to apply to the resultant force vector, radiate specifies the default radiation coefficient for cells in the f-mesh, and clamp_edges specifies edge conditions. Edge conditions determine whether or not a cell on an edge is considered adjacent to a corresponding cell on the opposite edge, for purposes of diffusion and pressure changes.

Any of the parameters may be described in terms of a value or a function.

Other Forces

In addition to the force types described above, other types of forces may be provided according to techniques similar to those described above, without departing from the spirit of the invention.

In the preferred embodiment, wherein system 100 is structured as an object-oriented system, forces are a virtual C++ base class, and the various types of forces described above are subclasses. Such a structure provides an open system, wherein new force types comprising new classes of objects may be added without rewriting a substantial portion of software. For example, a base class called IM_FORCE may be provided, having the following methods:

float IM_FORCE::getMagnitude(x,y,z)

vector IM_FORCE::getForce(x,y,z)

IM_FORCE::setMagnitude(magnitude)

IM_FORCE::setScale(scaleFactor)

IM_FORCE::setRotation(rotationAngle)

IM_FORCE::setRmod(rmodValue)

Other subclasses might have additional methods for setting position and other attributes.

Similarly, in the preferred embodiment, particles are provided according to an object-oriented structure. Paintbrushes are a base class, having both dynamic attributes (such as mass and velocity), and end behavior specifications (defining the image processing effect of the paintbrush). Individual particles carry a reference to a paintbrush object.

Additionally, image channels are provided as objects, having methods that support abstract channels as described above. Thus, given a position in display field 201, a channel returns a value.

The concepts of object-oriented programming, classes, subclasses, and methods are well known to those skilled in the art.

Attribute Inertia

As described above the user may specify that paintbrush attributes change in response to some characteristic of the image content. Consequently, abrupt changes in image content, such as those resulting from noise, may result in undesirable discontinuities in paintbrush attributes. For example, a paintbrush's color may be based on the color of the image at a particular location in display field 201. If the location is noisy, the paintbrush's color may flicker undesirably.

In order to reduce the effects of noise and other image discontinuities, system 100 may provide adjustable attribute inertia as an additional property of paintbrushes and other particles. Such inertia essentially implements an adjustable impulse response filter that prevents temporal discontinuities by providing a tendency to preserve an attribute's value and resist change. The inertia is user-adjustable, so that the time period for a change to take effect may vary.

In the preferred embodiment, attribute inertia may be implemented using either a finite response filter (FIR) or an infinite response filter (IIR). In the FIR case, the filtered attribute value is based on sampled attribute values at a number of sample points going back a fixed period of time, depending on the width of the filter. Thus, $V_{T+1}$ (the filtered attribute value for time T+1) is given by the equation:

$$V_{T+1} = \sum_{j=0}^{j=N-1} \omega_j V_{T-j} \qquad \text{(Eq. 6)}$$

where:

$V_{T-j}$ is the sampled attribute value at time T−j,

N is the width of the filter, based on user specification, and $\omega j$ is a set of arbitrary coefficients.

In the IIR case, the filtered attribute value is based on a weighted average of the current sampled attribute value and the previous filtered attribute value. Thus, $V_{T+1}$ is given by the equation:

$$V_{T+1} = (V_T * \omega) + (V_s * (1-\omega)) \qquad \text{(Eq. 7)}$$

where:

$V_T$ is the previous filtered attribute value, $V_S$ is the current sampled attribute value, and ω is an inertia coefficient, which controls the weight assigned to each of the two attribute values.

Figure 12:
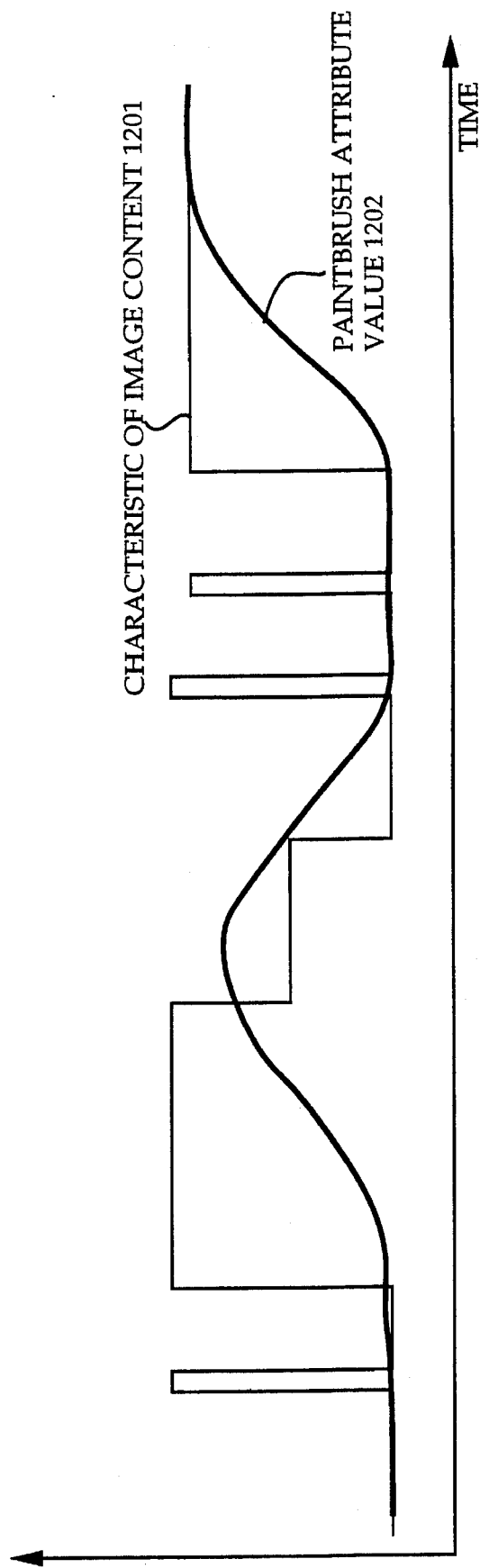
FIG. 12 is a diagram showing an example of the effect of attribute inertia.

Referring now to FIG. 12, there is shown an example of an implementation of attribute inertia. Attribute value 1202 is based on some characteristic of the image content 1201, which changes over time in a discontinuous manner. By providing inertia, the system prevents attribute value 1202 from changing abruptly in response to temporal discontinuities in image content 1201.

From the above description, it will be apparent that the invention disclosed herein provides a novel and advantageous system and method of dynamic image processing. The foregoing discussion discloses and describes merely exemplary methods and embodiments of the present invention. As will be understood by those familiar with the art, the invention may be embodied in other specific forms without departing from the spirit or essential characteristics thereof. For example, other types of forces or modes of interaction among forces, paintbrushes, and image content may be used. Accordingly, the disclosure of the present invention is intended to be illustrative, but not limiting, of the scope of the invention, which is set forth in the following claims.

What is claimed is:

1. A dynamic image processing system, comprising:

a display field for displaying a source image;

means for providing a plurality of virtual particles, each virtual particle having a virtual position within the display field;

means for associating a dynamic image processing element having a plurality of image processing attributes with each particle, the image processing element for selectively transforming a portion of the source image related to the virtual position in response to the image processing attributes of the element, to produce a transformed image;

means for providing one or more virtual forces for influencing the virtual position of the particles;

a storage device for storing the particles and the image processing attributes;

a user input device, coupled to the storage device, for accepting user specification of the particles and the image processing elements; and an output device, coupled to the storage device, for outputting the transformed image.

2. The dynamic image processing system of claim 1, wherein an image processing attribute varies as a function of a virtual force.

3. The dynamic image processing system of claim 1, wherein a virtual force varies as a function of a characteristic of the source image.

4. The dynamic image processing system of claim 1, wherein a virtual force varies as a function of a characteristic of the transformed image.

5. The dynamic image processing system of claim 1, wherein a force varies as a function of a measured gradient of a characteristic of the source image.

6. The dynamic image processing system of claim 1, wherein a virtual force varies as a function of a measured gradient of a characteristic of the transformed image.

7. The dynamic image processing system of claim 1, wherein the means for providing one or more virtual forces comprises:

means for providing a mesh within the display field, the mesh having a plurality of cells, each cell having a virtual position within the display field, each cell for generating a localized virtual force.

8. The dynamic image processing system of claim 7, wherein the localized virtual force of each cell selectively influences the virtual position of one or more particles having a virtual position related to the virtual position of the cell.

9. The dynamic image processing system of claim 7, wherein each cell has a pressure property, and wherein the localized virtual force of each cell is dependent on a difference in pressure between the cell and at least one neighboring cell.

10. The dynamic image processing system of claim 9, wherein each cell has a diffusion property, and wherein properties each cell selectively diffuse into neighbor cells in response to a difference in pressure and the diffusion property.

11. The dynamic image processing system of claim 7, wherein the localized virtual force of each cell varies interpolatively within the cell in response to the localized virtual force of neighbor cells.

12. The dynamic image processing system of claim 1, wherein the source image is a moving image and the transformed image is a moving image.

13. The dynamic image processing system of claim 1, wherein the virtual particles act as models of physical particles.

14. The dynamic image processing system of claim 1, wherein one or more image processing attributes has an inertia value for preventing temporal discontinuities in the transformed image.

15. The dynamic image processing system of claim 1, wherein an image processing attribute varies as a function of a characteristic of the source image.

16. The dynamic image processing system of claim 1, wherein an image processing attribute varies as a function of a characteristic of the transformed image.

17. A computer-implemented process of dynamically processing a source image, comprising the steps of:

initializing a plurality of virtual particles each having a virtual position within a display field:

associating with each virtual particle a dynamic image processing element, each element having a plurality of dynamic image processing attributes;

initializing one or more virtual forces that affect the virtual position of the particles;

initializing a time variable;

producing a transformed image by repeatedly performing the substeps of:

for each particle, determining a total effect of the virtual forces affecting the particle;

updating the position of each particle responsive to the total effect of the virtual forces;

updating the image processing attributes Of each image processing element;

for each particle, selectively transforming a portion of the source image related to the updated position responsive to the updated image processing attributes; and incrementing the time variable: and outputting the transformed image.

18. The computer-implemented process of claim 17, wherein the substep of determining a total effect of the virtual forces comprises the substeps of:

for each virtual force, determining the effect of the virtual force on the particle; and generating a force list containing information describing the effects of the virtual forces on the particle.

19. The computer-implemented process of claim 17, wherein the source image is a moving image and the transformed image is a moving image.

20. The computer-implemented process of claim 17, wherein the virtual particles act as models of physical particles.

21. The computer-implemented process of claim 17, further comprising the step of specifying an inertia value for an image processing attribute for preventing temporal discontinuities in the transformed image.

22. A computer-implemented process of providing an f-mesh force in a dynamic image processing system, comprising the steps of:
   defining a mesh within the display field containing a plurality of cells, each cell having a virtual position within the display field and a plurality of cell properties;
   for each cell,
      determining a flow vector between the cell and each of one or more neighbor cells as a function of one or more properties of the cell and one or more properties of the neighbor cells;
      defining an f-mesh force associated with the cell as a function of the flow vectors of the cell; and
   modifying a position of a particle in a dynamic image processing system as a function of the f-mesh force.

23. The computer-implemented process of claim 22, wherein each cell has an associated pressure property, and the step of defining an f-mesh force comprises the substeps of:
   for each neighbor cell, determining a flow vector between the cell and the neighbor cell based on the difference in pressure between the cell and the neighbor cell; and
   combining the flow vectors to obtain a force vector for the cell.

24. The computer-implemented process of claim 22, wherein each cell has an associated diffusion property and a radiation property, and the step of defining an f-mesh force further comprises:
   determining a force as a function of a pressure differential between the cell and neighbor cells, the diffusion property, and the radiation property.

25. The computer-implemented process of claim 24, wherein the step of determining a force comprises the substeps of:
   for each neighbor cell, determining a pressure differential between the cell and the neighbor cell;
   for each neighbor cell, scaling the pressure differential in response to the diffusion property of the cell;
   obtaining a total pressure differential by summing the pressure differentials; and
   altering the force for the cell in response to the pressure differential, and the radiation property of the cell.

26. The computer-implemented process of claim 22, further comprising the steps of:
   accepting a stroke input;
   sampling the stroke input to produce a series of vectors, each vector having a virtual position within the display field; and
   for each vector, defining an f-mesh force associated with a cell having a virtual position corresponding to the virtual position of the vector.

27. The computer-implemented process of claim 22, further comprising the steps of:
   accepting a stroke input;
   sampling the stroke input to produce a series of vectors, each vector having a virtual position within the display field;
   separating each vector into vector components; and
   for each vector component, defining an f-mesh force associated with a cell having a virtual position corresponding to the virtual position of the vector component.

28. The computer-implemented process of claim 22 wherein a plurality of meshes are defined in the display field.

* * * * *